(12) United States Patent
Park

(10) Patent No.: US 10,958,109 B2
(45) Date of Patent: Mar. 23, 2021

(54) WIRELESS POWER TRANSMITTER AND RECEIVER

(71) Applicant: LG ELECTRONICS INC., Seoul (KR)

(72) Inventor: Yongcheol Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 122 days.

(21) Appl. No.: 16/411,963

(22) Filed: May 14, 2019

(65) Prior Publication Data

US 2019/0267848 A1    Aug. 29, 2019

Related U.S. Application Data

(63) Continuation of application No. 15/554,876, filed as application No. PCT/KR2016/001873 on Feb. 25, 2016, now Pat. No. 10,340,749.

(60) Provisional application No. 62/127,847, filed on Mar. 4, 2015.

(51) Int. Cl.

| | |
|---|---|
| *H02J 50/40* | (2016.01) |
| *H02J 7/00* | (2006.01) |
| *H04B 5/00* | (2006.01) |
| *H02J 7/02* | (2016.01) |
| *H02J 50/12* | (2016.01) |
| *H02J 50/80* | (2016.01) |

(52) U.S. Cl.
CPC ............ *H02J 50/40* (2016.02); *H02J 7/0013* (2013.01); *H02J 7/025* (2013.01); *H02J 50/12* (2016.02); *H02J 50/80* (2016.02); *H04B 5/0037* (2013.01); *H04B 5/0081* (2013.01); *Y02T 10/70* (2013.01)

(58) Field of Classification Search
CPC .. H02J 50/40; H02J 50/80; H02J 50/12; H02J 7/0013; H02J 7/024; H02J 7/00; H02J 7/02; H04B 5/0037; H04B 5/0081; H04B 5/00; Y02T 10/70
See application file for complete search history.

(56) References Cited

U.S. PATENT DOCUMENTS

| | | |
|---|---|---|
| 8,175,660 B2 | 5/2012 | Porwall |
| 2005/0151511 A1 | 7/2005 | Chary |
| 2013/0005251 A1 | 1/2013 | Soar |

(Continued)

FOREIGN PATENT DOCUMENTS

| | | |
|---|---|---|
| JP | 2015-37229 A | 2/2015 |
| KR | 10-2013-0027947 A | 3/2013 |
| KR | 10-2013-0081776 A | 7/2013 |

(Continued)

*Primary Examiner* — Robert L Deberadinis
(74) *Attorney, Agent, or Firm* — Birch, Stewart, Kolasch & Birch, LLP

(57) ABSTRACT

A method in which a power transmitter comprising multi coils transmits wireless power, includes detecting a second power receiver while transmitting power to a first power receiver, determining at least one primary coil appropriate for power transmission, determining whether the second power receiver supports a shared mode protocol using the determined at least one primary coil, and transmitting, if the second power receiver supports a shared mode protocol, power to the first and second power receivers according to the shared mode protocol, wherein the shared mode protocol is a protocol that simultaneously manages information exchange between the power transmitter and a plurality of power receivers.

16 Claims, 13 Drawing Sheets

(56) References Cited

U.S. PATENT DOCUMENTS

2013/0328417 A1  12/2013  Takeuchi

FOREIGN PATENT DOCUMENTS

| KR | 10-2014-0124708 A | 10/2014 |
| WO | WO 2013/146929 A1 | 10/2013 |

[Fig. 1]
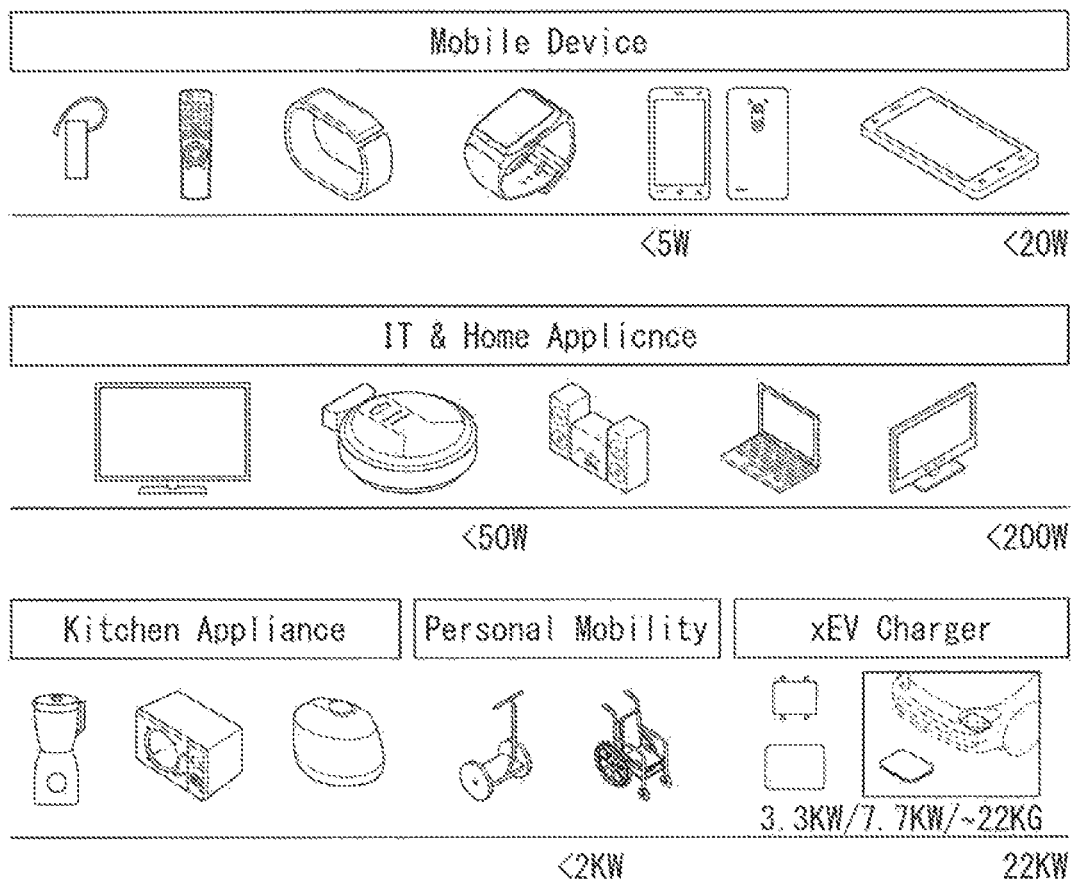

[FIG. 2]
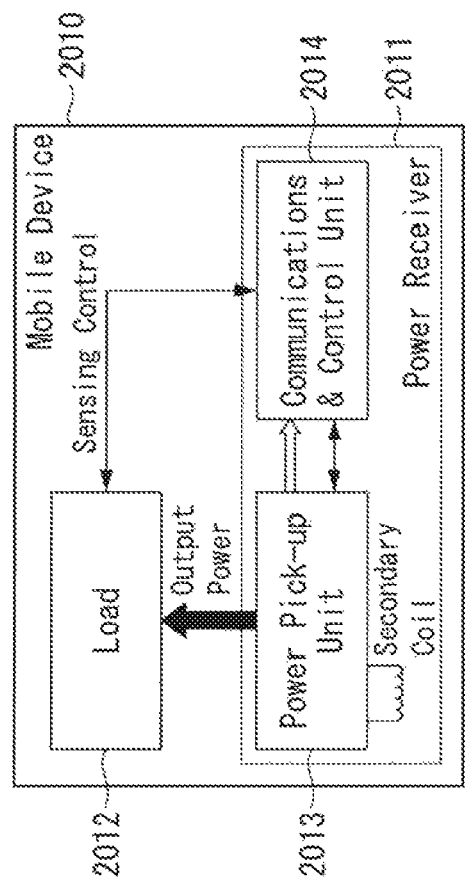
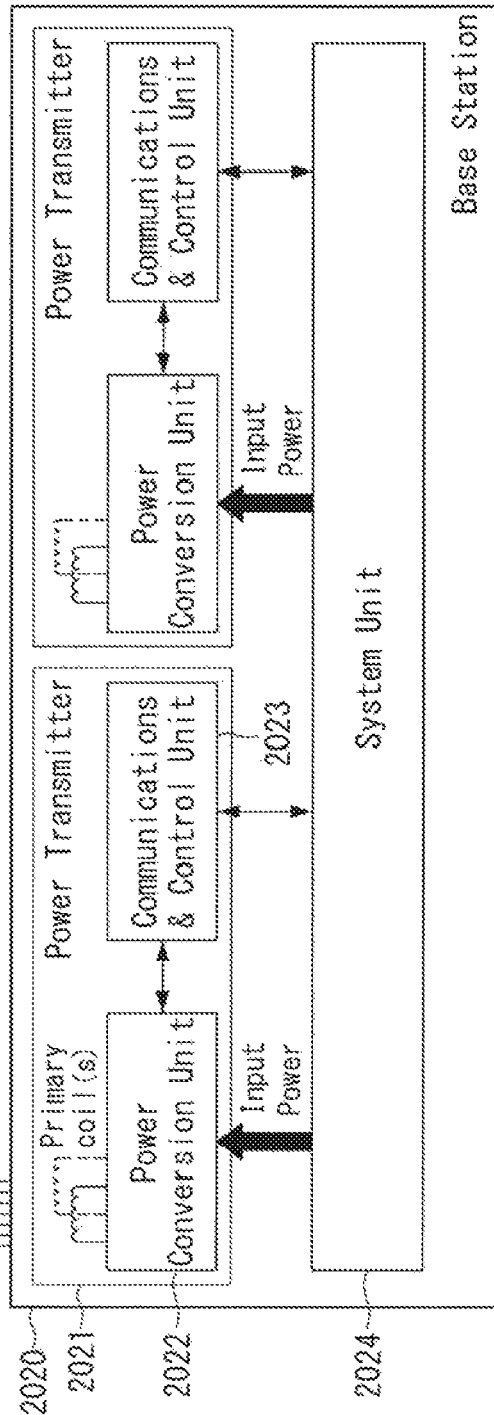

[Fig. 3]
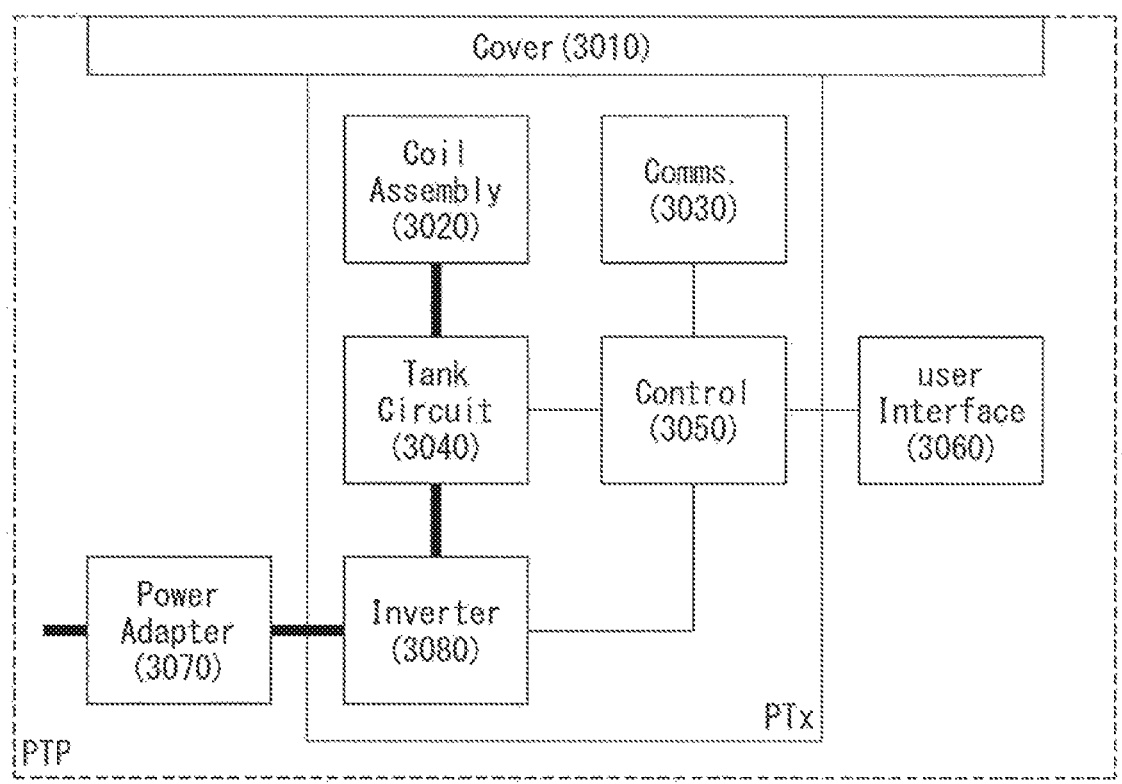

[Fig. 4]
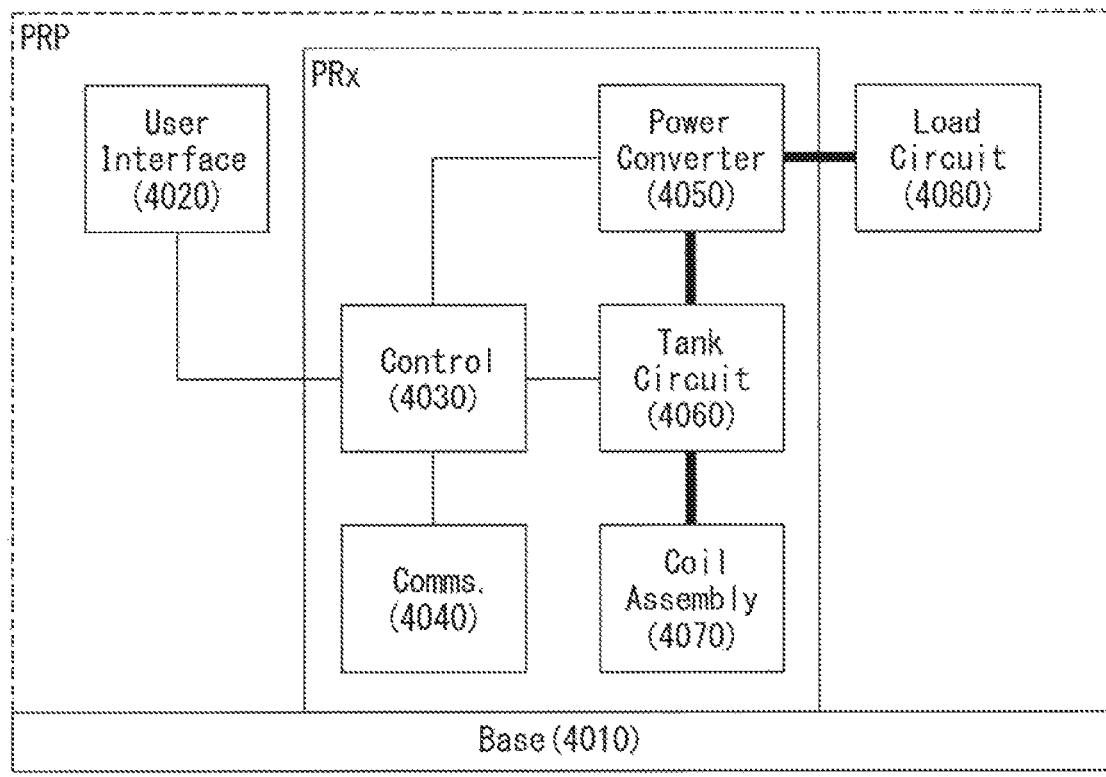
[Fig. 5]
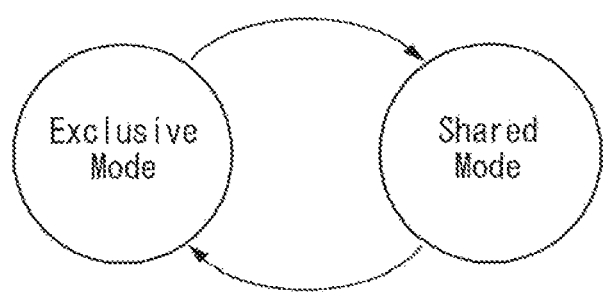

[Fig. 6]
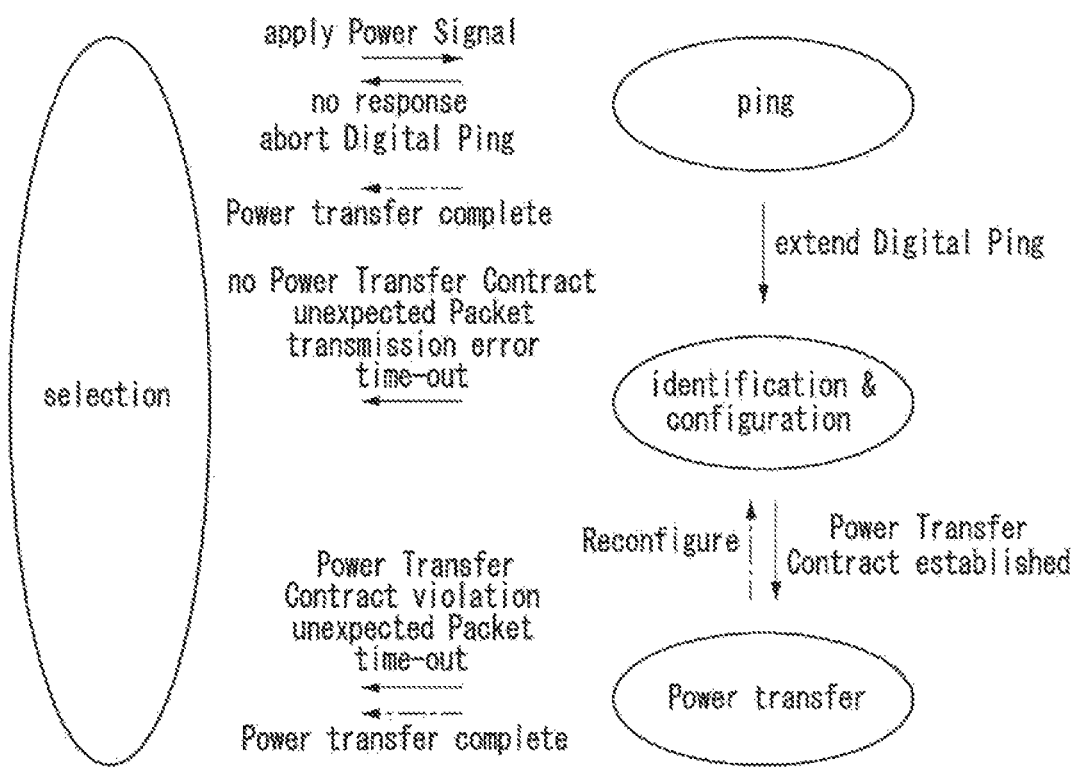

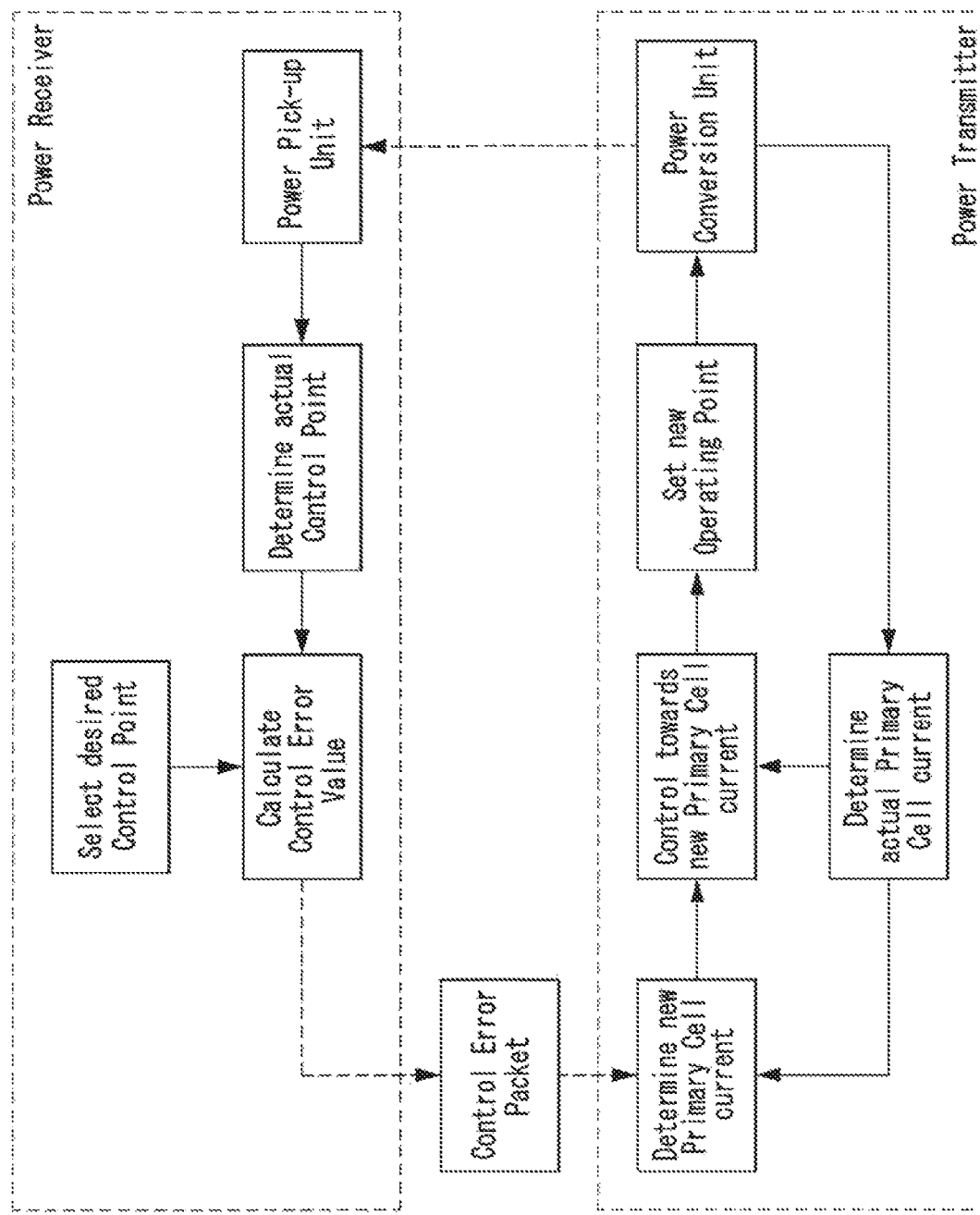
[FIG. 7]

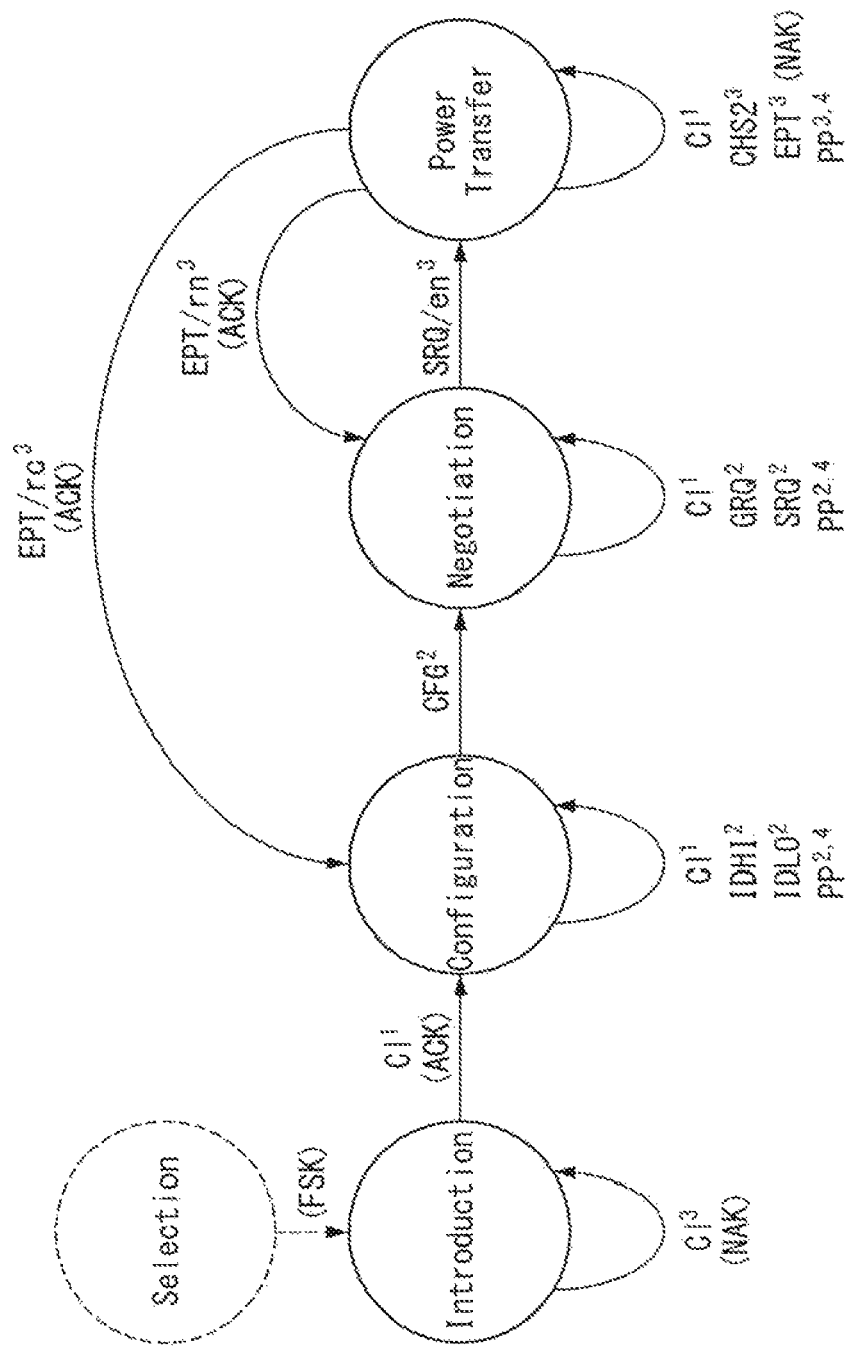

[FIG. 9]
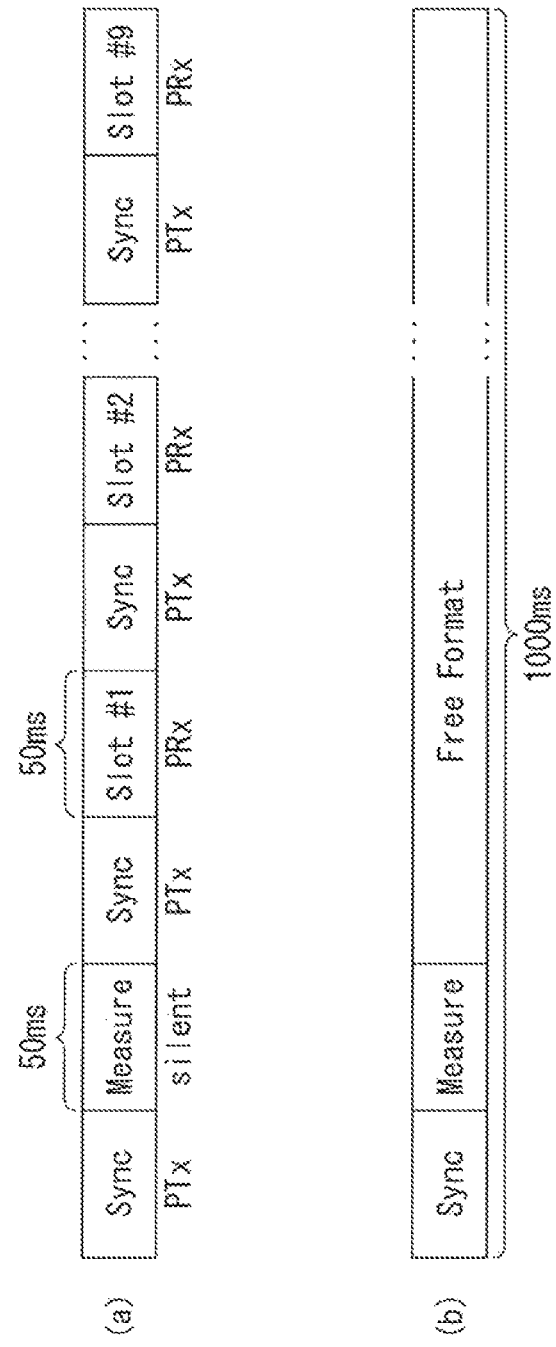

[FIG. 10]

| Preamble | ZERO | Response | Type | Info | Parity |

Response
'00': no comms
'01': comms error
'10': NAK
'11': ACK

Type
ZERO: slot sync
ONE: frame sync

Parity: odd

Info (Type is ZERO)
'00': allocated
'01': locked
'10': free
'11': reserved

Info (Type is ONE)
'00': slotted
'01': free format
'10': reserved
'11': reserved

[Fig. 11]

|    | b7          | b6  | b5       | b4 | b3            | b2   | b1       | b0 |
|----|-------------|-----|----------|----|---------------|------|----------|----|
| B0 | Power Class |     | Maximum Power |    |           |      |          |    |
| B1 | Reserved    |     |          |    |               |      |          |    |
| B2 | Prop        | Reserved |     |    | ZERO          | Count |        |    |
| B3 | Window Size |     |          |    | Window Offset |      |          |    |
| B4 | Neg         | Pol | Depth    |    | Operation Mode | Reserved |    |    |

[Fig. 12]

|    | b7          | b6  | b5       | b4 | b3            | b2   | b1       | b0 |
|----|-------------|-----|----------|----|---------------|------|----------|----|
| B0 | Power Class |     | Maximum Power |    |           |      |          |    |
| B1 | Reserved    |     |          |    |               |      |          |    |
| B2 | Prop        | Reserved |     |    | ZERO          | Count |        |    |
| B3 | Window Size |     |          |    | Window Offset |      |          |    |
| B4 | Neg         | Pol | Depth    |    | Shared Mode   | Reserved |    |    |

[Fig. 13]
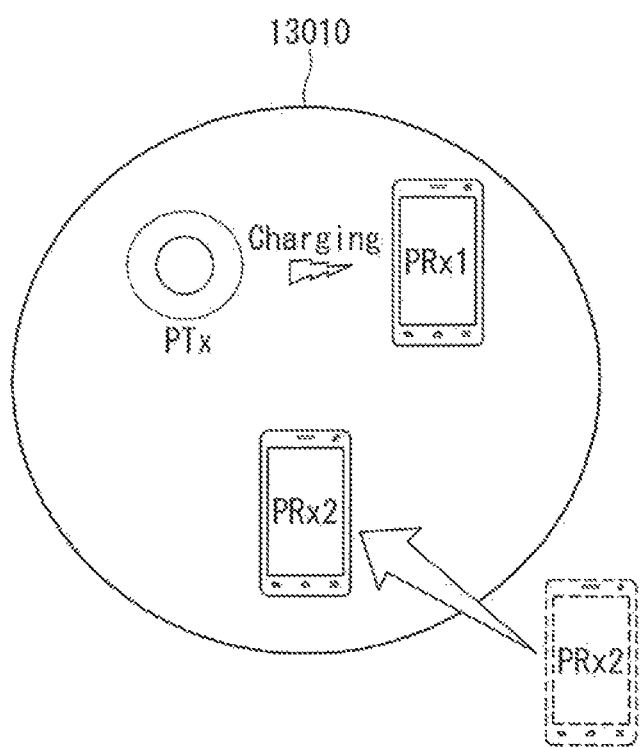

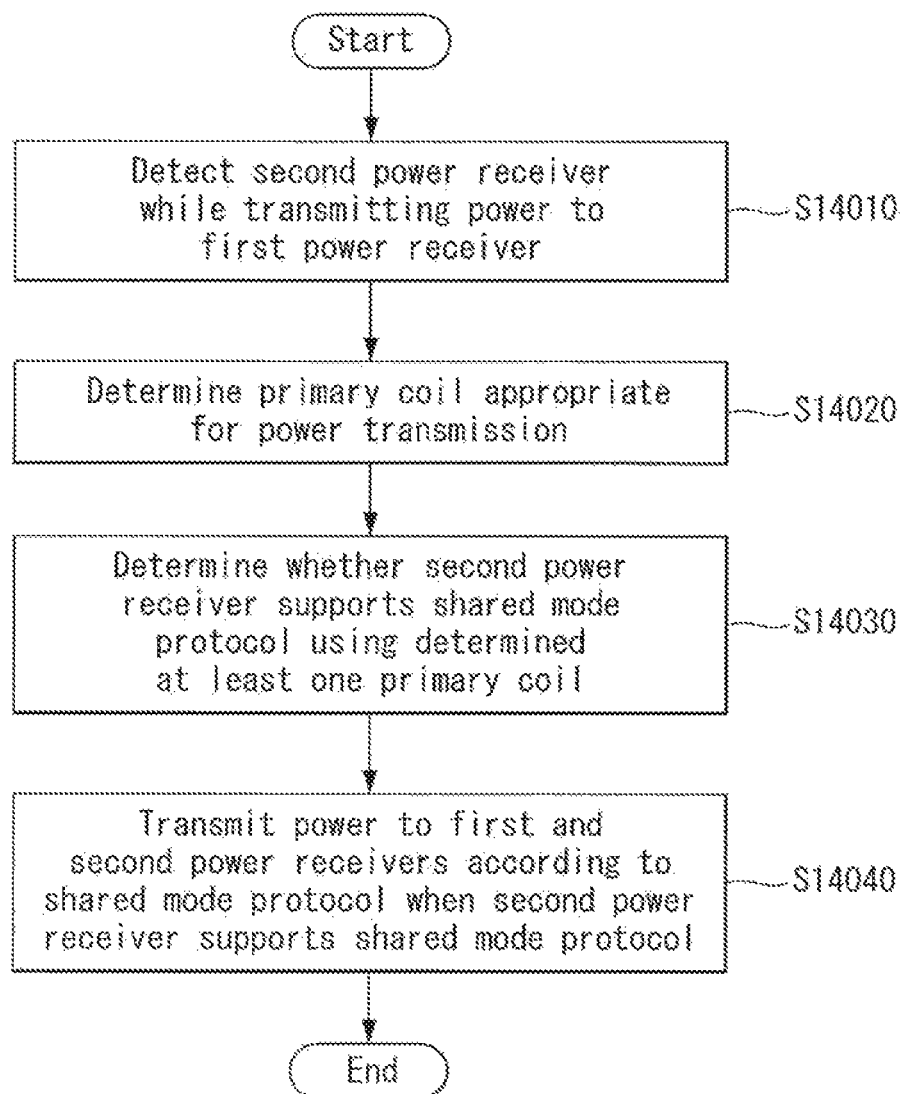
[Fig. 14]

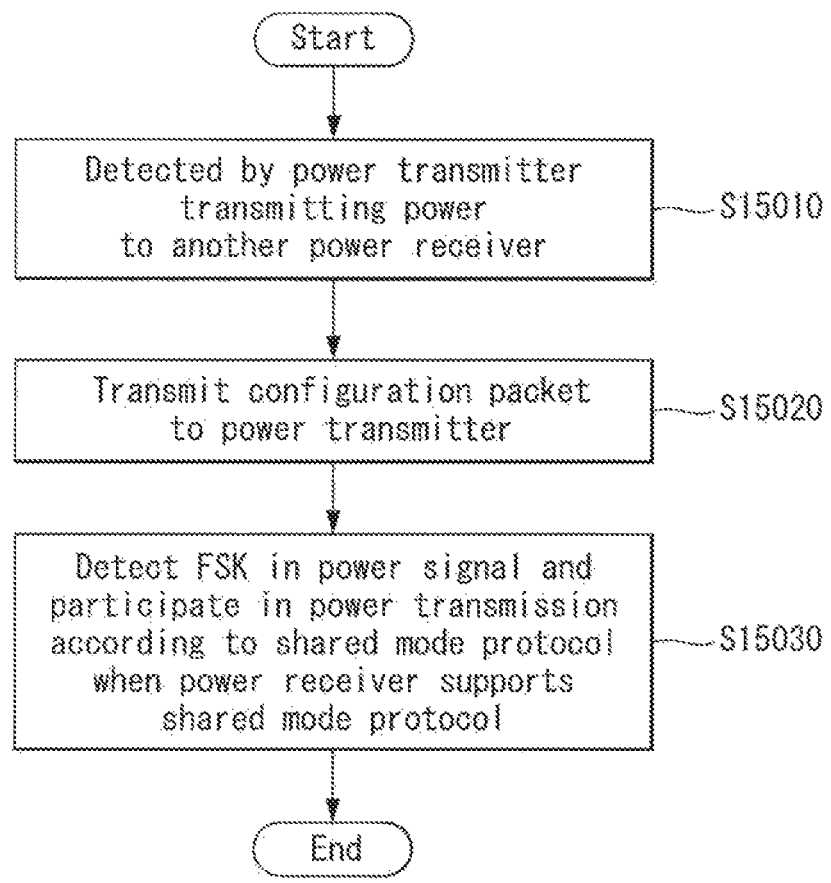
[Fig. 15]

WIRELESS POWER TRANSMITTER AND RECEIVER

CROSS-REFERENCE TO RELATED APPLICATIONS

This application is a Continuation of U.S. patent application Ser. No. 15/554,876 filed on Aug. 31, 2017, which is the National Phase of PCT/KR2016/001873 filed on Feb. 25, 2016, which claims priority under 35 U.S.C. § 119(e) to U.S. Provisional Application No. 62/127,847 filed on Mar. 4, 2015, all of these applications are hereby expressly incorporated by reference into the present application.

BACKGROUND OF THE INVENTION

Field of the Invention

The present invention relates to a wireless power transmitter and receiver and a method of controlling the same.

Discussion of the Related Art

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

SUMMARY OF THE INVENTION

The present invention provides operation of a power transmitter that flexibly adjusts a power amount transmitting to each power receiver according to a change in the number of charging power receivers.

In accordance with an aspect of the present invention, a method in which a power transmitter including multi coils transmits wireless power includes: detecting a second power receiver while transmitting power to a first power receiver; determining at least one primary coil appropriate for power transmission; determining whether the second power receiver supports a shared mode protocol using the determined at least one primary coil; and transmitting, if the second power receiver supports the shared mode protocol, power to the first and second power receivers according to the shared mode protocol, wherein the shared mode protocol is a protocol that simultaneously manages information exchange between the power transmitter and a plurality of power receivers.

Further, the determining of whether the second power receiver supports the shared mode protocol may include receiving a configuration packet from the second power receiver; and determining whether the second power receiver supports the shared mode protocol through a mode field included in the configuration packet.

Further, the determining of whether the second power receiver supports the shared mode protocol through the mode field may include determining that the second power receiver supports the shared mode protocol when the mode field is set to '1', and determining that the second power receiver does not support the shared mode protocol when the mode field is set to '0'.

Further, if the second power receiver supports the shared mode protocol, the method may further include starting power transmission to the second power receiver at a start time point of a next slotted frame.

Further, if the second power receiver does not support the shared mode protocol, the method may further include not transmitting power to the second power receiver until the power transmitter is prepared to serve the second power receiver in an exclusive mode, wherein the exclusive mode may be a mode that serves one power receiver at one time.

Also, in accordance with another aspect of the present invention, a method in which a power receiver receives wireless power includes: being detected by a power transmitter transmitting power to another power receiver; transmitting a configuration packet indicating whether the power receiver supports a shared mode protocol to the power transmitter; and detecting, if the power receiver supports the shared mode protocol, Frequency Shift Keying (FSK) in a power signal received from the power transmitter and participating in power transmission of the power transmitter together with the another power receiver according to the shared mode protocol, wherein the shared mode protocol is a protocol that simultaneously manages information exchange between the power transmitter and a plurality of power receivers.

Further, a mode field included in the configuration packet may indicate whether the power receiver supports the shared mode protocol.

Further, when the mode field is set to '1', the mode field may indicate that the power receiver supports the shared mode protocol, and when the mode field is set to '0', the mode field may indicate that the power receiver does not support the shared mode protocol.

Further, if the power receiver supports the shared mode protocol, the method may further include starting power reception from the power transmitter at a start time point of a next slotted frame.

Further, if the power receiver does not support the shared mode protocol, the method may further include not receiving power from the power transmitter until the power transmitter is prepared to serve the power receiver in an exclusive mode, wherein the exclusive mode is a mode in which the power transmitter serves one power receiver at one time.

Also, in accordance with another aspect of the present invention, a power transmitter includes a coil assembly including multi coils; an inverter that converts a DC signal to an AC signal; a tank circuit that provides impedance matching; a communication unit that performs communication with a power receiver; and a control unit that controls power transfer, wherein the power transmitter detects a second power receiver while transmitting power to a first power receiver, determines at least one primary coil appropriate for power transmission, determines whether the second power receiver supports a shared mode protocol using the determined at least one primary coil, and transmits power to the first and second power receivers according to the shared mode protocol when the second power receiver supports the shared mode protocol, wherein the shared mode protocol is a protocol that simultaneously manages information exchange between the power transmitter and a plurality of power receivers.

Further, the power transmitter may receive a configuration packet from the second power receiver and determine whether the second power receiver supports the shared mode protocol through a mode field included in the configuration packet.

Further, when the mode field is set to '1', the power transmitter may determine that the second power receiver supports the shared mode protocol, and when the mode field is set to '0', the power transmitter may determine that the second power receiver does not support the shared mode protocol.

Further, when the second power receiver supports the shared mode protocol, the power transmitter may start power transmission to the second power receiver at a start time point of a next slotted frame.

Further, when the second power receiver does not support the shared mode, the power transmitter may not transmit power to the second power receiver until the power transmitter is prepared to serve the second power receiver in an exclusive mode, and the exclusive mode may be a mode that serves one power receiver at one time.

Also, in accordance with another aspect of the present invention, a power receiver includes: a coil assembly including multi coils; a power converter that converts AC power to a voltage and a current appropriate for a load circuit; a tank circuit that provides impedance matching; a communication unit that performs communication with a power receiver; and a control unit that controls power transfer, wherein the power receiver is detected by a power transmitter transmitting power to another power receiver, transmits a configuration packet indicating whether the power receiver supports a shared mode protocol to the power transmitter, when the power receiver supports the shared mode protocol, detects Frequency Shift Keying (FSK) in a power signal received from the power transmitter, and participates in power transmission of the power transmitter together with the another power receiver according to the shared mode protocol, wherein the shared mode protocol is a protocol that simultaneously manages information exchange between the power transmitter and a plurality of power receivers.

Further, a mode field included in the configuration packet may indicate whether the power receiver supports the shared mode protocol.

Further, when the mode field is set to '1', the mode field may indicate that the power receiver supports the shared mode protocol, and when the mode field is set to '0', the mode field may indicate that the power receiver does not support the shared mode protocol.

Further, when the power receiver supports the shared mode protocol, the power receiver may start power reception from the power transmitter at a start time point of a next slotted frame.

Further, when the power receiver does not support the shared mode protocol, the power receiver may not receive power from the power transmitter until the power transmitter is prepared to serve the power receiver in an exclusive mode, and wherein the exclusive mode may be a mode in which the power transmitter serves one power receiver at one time.

According to an embodiment of the present invention, while a power transmitter transmits power, even if a new power receiver participates in charge, the power transmitter can let the new power receiver be participated in power transmission effectively without disturbing power transmission to an already charging power receiver.

Further, according to an embodiment of the present invention, a power receiver operating in an exclusive mode among a plurality of power receivers operating in a shared mode can be detected.

In addition, various effects according to an embodiment of the present invention will be described in detail hereinafter.

BRIEF DESCRIPTION OF THE DRAWINGS

FIG. 1 is a diagram illustrating an embodiment of various electronic devices in which a wireless charge system is introduced.

FIG. 2 is a block diagram of a wireless power transmitting/receiving system according to an embodiment of the present invention.

FIG. 3 is a block diagram of a power transmitting equipment according to an embodiment of the present invention.

FIG. 4 is a block diagram of a power receiving equipment according to an embodiment of the present invention.

FIG. 5 is a diagram illustrating an operating mode of a wireless power transmitting/receiving system according to an embodiment of the present invention.

FIG. 6 is a state diagram of a wireless power transmitter in an exclusive mode.

FIG. 7 is a diagram illustrating a power transfer control method in an exclusive mode.

FIG. 8 is a state diagram of a power receiver in a shared mode.

FIG. 9 is a diagram illustrating a frame structure for data communication.

FIG. 10 is a diagram illustrating a format of a sync pattern according to an embodiment of the present invention.

FIG. 11 is a diagram illustrating a configuration packet according to a first embodiment of the present invention.

FIG. 12 is a diagram illustrating a configuration packet according to a second embodiment of the present invention.

FIG. 13 is a diagram illustrating a case of increasing the number of charging power receivers according to an embodiment of the present invention.

FIG. 14 is a flowchart of a shared mode protocol of a power transmitter according to an embodiment of the present invention.

FIG. 15 is a flowchart of a shared mode protocol of a power receiver according to an embodiment of the present invention.

DETAILED DESCRIPTION OF THE EMBODIMENTS

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

A wireless power transmitter and wireless power receiver of a resonant type proposed by an embodiment of the present invention and a wireless charging method and a communication protocol using the wireless power transmitter and wireless power receiver are described below. Hereinafter, a wireless power transmitter may be abbreviated as a power transmitter or a transmitter, and a wireless power receiver may be abbreviated as a power receiver or a receiver.

FIG. 1 shows an embodiment of various electronic devices into which a wireless charging system is introduced.

FIG. 1 shows that electronic devices are classified depending on an amount of power that is transmitted and received in a wireless charging system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, TV, audio equipment, and a monitor. A large power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which the small wireless charging method is applied is chiefly described for convenience of description, but this is only an embodiment. A wireless charging method in accordance with an embodiment of the present invention may be applied to the aforementioned various electronic devices.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

Hereinafter, a coil or a coil unit may also be called a coil assembly, a coil cell, or a cell which includes a coil and at least one element close to the coil.

FIG. 3 is a block diagram of the power transmitter product in accordance with an embodiment of the present invention.

Referring to FIG. 3, the power transmitter product PTP may include at least one of a cover configured to cover a coil assembly 3020, a power adapter 3070 configured to supply power to a power transmitter PTx, the power transmitter PTx configured to send (or transmit) wireless power, or a user interface 3060 configured to provide information related to the progress of power transfer and other related information. In particular, the user interface 3060 may be optionally included in the power transmitter product PTP or may be included as another user interface of the power transmitter product PTP.

The power transmitter PTx may include at least one of the coil assembly 3020, a tank circuit (or impedance matching circuit) 3040, an inverter 3080, a communication unit 3030, or a control unit 3050.

The coil assembly 3020 may include at least one primary coil for generating a magnetic field.

The tank circuit 3040 may provide impedance matching between the inverter 3080 and the primary coil(s). The tank circuit 3040 may generate resonance in a frequency suitable for boosting the current of the primary coil. In a multi-coil PTx, the tank circuit 3040 may further include a multiplexer for routing a signal from the inverter 3080 to a subset of the primary coils. The tank circuit 3040 may also be called an impedance matching circuit.

The inverter 3080 may change DC input into an AC signal. The inverter 3080 may be driven as a half-bridge or a full-bridge so that it generates a pulse wave of an adjustable frequency and a duty cycle. Furthermore, the inverter 3080 may include a plurality of stages for controlling an input voltage level.

The communication unit 3030 may perform communication with a power receiver. The power receiver performs load modulation in order to communicate a request and information for the power transmitter PTx. Accordingly, the power transmitter PTx may monitor the amplitude and/or phase of the current and/or voltage of the primary coil in order to demodulate data transmitted by a power receiver using the communication unit 3030. Furthermore, the power transmitter PTx may control output power so that data is transmitted through the communication unit 3030 using a frequency shift keying (FSK) method. To this end, the power transmitter PTx may further include a current sensor. In this case, the power transmitter PTx may discover a power receiver by detecting a change in the current of the primary coil and detect data transmitted by the discovered power receiver.

The control unit 3050 may control the communication and power transfer of the power transmitter PTx. The control unit 3050 may control power transfer by controlling the aforementioned operating point. The operating point may correspond to at least one of an operating frequency, a duty cycle, a duty ratio, or an input voltage, for example.

The elements of the power transmitter product PTP may be provided as separate units/elements/chipsets or may be provided as a single unit/element/chipset as shown in FIG. 1. For example, the communication unit and the control unit may be provided as separate elements/chipsets or may be provided as a single element/chipset as shown in FIG. 1. Furthermore, the elements of the power transmitter product PTP may be optionally included, or a new element(s) may be added to the power transmitter product PTP.

FIG. 4 is a block diagram of a power receiver product in accordance with an embodiment of the present invention.

Referring to FIG. 4, the power receiver product PRP may include at least one of a user interface 4020 configured to provide information about the progress of power reception and other related information, a power receiver PRx configured to receive wireless power, a load circuit 4080, or a base 4010 configured to support or cover a coil assembly 4070. In particular, the user interface 4020 may be optionally included in the power receiver product PRP or may be included as another user interface of the power receiver product PRP.

The power receiver PRx may include at least one of a power converter 4050, a tank circuit (or impedance matching circuit) 4060, the coil assembly 4070, a communication unit 4040, or a control unit 4030.

The power converter 4050 may convert AC power, received from a secondary coil, into a voltage and current suitable for the load circuit 4080. The power converter 4050 may include a rectifier. The power converter 4050 may further adapt reflected impedance of the power receiver PRx.

The tank circuit 4060 may provide impedance matching between the secondary coil and a combination of the power converter 4050 and the load circuit 4080. In an embodiment, the tank circuit 4060 may generate resonance of about 100 kHz which may enhance power transfer.

The coil assembly 4070 includes at least one secondary coil and may further include an element for shielding the metal part of a receiver against a magnetic field.

The communication unit 4040 may perform load modulation in order to communicate a request and other information for the power transmitter PTx. To this end, the power receiver PRx may switch a resistor or capacitor on or off so that reflected impedance is changed.

The control unit 4030 may control reception (or received) power. To this end, the control unit 4030 may determine/calculate a difference between the actual operating point of the power receiver PRx and a required operating point. Furthermore, the control unit 4030 may control/reduce a difference an actual operating point and a required operating point by making a request to control reflected impedance and/or the operating point of the power transmitter PTx. If such a difference is minimized, power can be optimally received.

The elements of the power transmitter product PTP may be provided as separate units/elements/chipsets or may be provided as a single unit/element/chipset as shown in FIG. 1. For example, the communication unit and the control unit may be provided as separate elements/chipsets or may be provided as a single element/chipset as shown in FIG. 1. Furthermore, the elements of the power transmitted product PTP may be optionally included, or a new element(s) may be added the power transmitter product PTP.

FIG. 5 is a diagram illustrating an operating mode of a wireless power transmitting/receiving system according to an embodiment of the present invention.

A power transmitter may operate in a shared mode and/or an exclusive mode.

In a shared mode, one power transmitter simultaneously serves a plurality of power receivers (i.e., may provide power to a plurality of power receivers). A shared mode protocol simultaneously manages information exchange between a power transmitter and at least one power receiver in a shared mode.

The power transmitter and the power receiver optionally support a shared mode. That is, a shared mode may be optionally supported by the power transmitter and the power receiver. Therefore, when the power transmitter/receiver supports a shared mode, it may be necessary to notify this to another party power transmitter/receiver. In the present invention, a method of notifying this using a configuration packet (CFG) is suggested, and a detailed description related thereto will be described in detail hereinafter in relation to FIGS. 11 to 14.

In an exclusive mode, the power transmitter serves one power receiver at one time (i.e., provides power to one power receiver at one time). An exclusive mode protocol manages information exchange between the power transmitter and the power receiver in an exclusive mode. The power transmitter and the power receiver mandatorily support an exclusive mode. That is, an exclusive mode may be mandatorily supported by the power transmitter and the power receiver.

In an exclusive mode, the power receiver has the entire control right in power transmission. In other words, the power receiver may control to increase or reduce a power amount (or amount of magnetic power) being transmitted by the power transmitter. For this, a communication protocol between the power transmitter and the power receiver provides a feedback loop for enabling the power receiver to control to appropriately increase or reduce a current amount flowing through a primary coil of the power transmitter. For feedback to the power transmitter, the power receiver may use a temperature, a voltage, a current value, or a specific sensor included in a power receiving equipment.

In a shared mode, the power transmitter may control a power amount (or amount of magnetic power) such that each power receiver receiving power from the power transmitter shares power. The power receiver may appropriately adjust impedance thereof to change a power amount receiving from a magnetic field. When the power receiver may not (no longer) adjust impedance thereof, the power receiver may control (or warn) to increase or reduce a power amount being transmitted by the power transmitter. For this, a communication protocol between the power transmitter and the power receiver may provide a communication mechanism that synchronizes the control of the power transmitter by each power receiver. In preparation for a collision of the control, the control that increases a receiving power amount may have a priority higher than the control that reduces a receiving power amount.

A shared mode may be referred to as a resonant mode, and an exclusive mode may be referred to as an induction mode. A wireless power transmitting/receiving system may transmit/receive resonant power in a shared mode and may transmit/receive induction power in an exclusive mode.

Hereinafter, first, a power transfer method of a power transmitter/receiver operating in an exclusive mode will be described. However, a method described in an exclusive mode or at least one of steps included in the method may be optionally applied to a shared mode.

FIG. 6 is a state diagram of a wireless power transmitter in an exclusive mode.

Referring to FIG. 6, in an exclusive mode, wireless charge may be performed through four phases. The four phases include a selection phase, a ping phase, an identification & configuration phase, and a power transfer phase.

At the selection phase, the power transmitter monitors contact/separation of an object with/from an interface surface provided at the transmitter. For this reason, the power transmitter may use various means. When at least one object is found, the power transmitter may attempt to search for an accurate position of the found object (particularly, when the power transmitter supports free positioning). Further, the power transmitter may distinguish whether the found object is a power receiver or a simple external object (key, coin). Further, the power transmitter may attempt to select a power receiver for power transmission.

When sufficient information for performing the above-described operations does not exist, the power transmitter may repeatedly perform a ping phase and an identification & configuration phase (whenever this phase is performed, different primary coils may be selected), and after related information is collected, the power transmitter may return to a selection phase.

When the power transmitter selects a primary coil for transmitting power to the power receiver, the power transmitter may enter to the ping phase. In contrast, when the power transmitter does not select a power receiver for power transmission and/or when the power transmitter does not provide power to the power receiver because of excess of a predetermined time, the power transmitter may operate in a stand-by mode.

At the ping phase, the power transmitter may perform digital ping and stand by a response of the power receiver. The digital ping represents application/transmission of a power signal for detecting and identifying the power receiver. When the power transmitter finds the power receiver, the power transmitter may enlarge digital ping and proceed to the identification & configuration phase.

At the identification & configuration phase, the power transmitter may identify the selected power receiver and acquire configuration information of the power receiver such as a maximum power amount. In other words, the power transmitter may receive identification/configuration information, acquire information about the power receiver, and create a power transfer contract using the information. The power transfer contract may include a limitation of a plurality of parameters that characterize power transfer at a subsequent power transfer phase.

At the power transfer phase, the power transmitter provides power to the power receiver by wireless. The power transmitter may receive control data of transmitted power from the power receiver to adjust a primary cell current, thereby controlling power transfer. Further, the power transmitter may monitor parameters included in a power transfer contract. While transferring power, when a limitation of parameters according to a power transfer contract is violated, the power transmitter may stop power transfer and advance to a selection phase.

A state diagram described in this drawing is a state diagram described based on a low power mode, and in an intermediate power mode, a new phase (e.g., calibration phase, negotiation phase, and renegotiation phase) may be added or some phases may be deleted.

FIG. 7 is a diagram illustrating a power transfer control method in an exclusive mode.

In FIG. 7, the power transmitter and the power receiver each may include a power conversion unit and a power pickup unit, as shown in FIG. 1.

At the power transfer phase of the exclusive mode, the power transmitter and the power receiver may perform communication together with power transmission and reception to control an amount of transferred power. The power receiver may select a specific control point and operate with a specific control point. The control point represents a combination of a voltage and a current provided from an output of the power receiver when power transfer is performed.

In more detail, the power receiver may select a desired control point (a desired output current/voltage, a temperature of a specific position of a mobile device) and additionally determine a currently operating actual control point. The power receiver may calculate a control error value using a desired control point and an actual control point and transmit the control error value as a control error packet to the power transmitter. The control error packet is transmitted/received at a predetermined time interval at the power transfer phase, and as an embodiment, when reducing a current of the power transmitter, the power receiver may set a control error value to the negative number and transmit the control error value, and when increasing a current of the power transmitter, the power receiver may set a control error value to the positive number and transmit the control error value.

In order to determine a new primary cell current, the power transmitter may use a received control error value and an actual primary cell current. After a system is stabilized by communication of a control error packet, the power transmitter may control an actual primary cell current with a new primary cell current. In this case, the power transmitter may operate at a new operation point (amplitude, frequency, and duty cycle applied to a primary cell).

In a resonant mode to describe hereinafter, the power transmitter may operate with a method different from a method in an exclusive mode. In a resonant mode, one power transmitter should be able to simultaneously serve a plurality of power receivers. However, as in the foregoing exclusive mode, when power transfer is controlled, transferred power is controlled by communication with one power receiver and thus it may be difficult to control power transfer to additional power receivers. Therefore, in a resonant mode, the power transmitter may commonly transfer basic power, and the power receiver may control a resonant frequency thereof to control a receiving power amount. However, even in operation in such a resonant mode, a method described in relation to FIGS. 6 and 7 is not completely excluded, and the control of additional transmission power may be performed with a method of FIGS. 6 and 7.

FIG. 8 shows the state diagram of the power receiver in shared mode. Hereinafter, the power receiver is chiefly described, but a description regarding the state to be described later may be identically (or similarly) applied to the power transmitter.

In shared mode, the power receiver may be in a selection state, an introduction state, a configuration state, a negotiation state, or a power transfer state. The selection state may correspond to a selection phase, the introduction state may correspond to an introduction phase, the configuration state may correspond to a configuration phase, the negotiation status may correspond to a negotiation phase, and the power transfer state may correspond to a power transfer phase.

The selection phase corresponds to a selection phase in which in exclusive mode, the power transmitter monitors the contact/detachment of an object with respect to a surface of the interface included in the power transmitter. The selection phase in shared mode may be omitted. Accordingly, the power receiver may perform the remaining four phases. When detecting the presence of frequency shift keying (FSK) in a power signal prior to wake-up time-out, the power receiver may immediately perform the introduction phase after the selection phase.

In the introduction phase, the power receiver may request a free slot in which a control information (CI) packet to be used in next phases (e.g., the configuration phase, the negotiation phase, or the power transfer phase) will be transmitted. To this end, the power receiver sends an initial CI packet. If the power transmitter makes a response as ACK, the power receiver may enter the configuration phase. If the power transmitter makes a response as NACK, another power receiver may have performed the configuration phase or the negotiation phase. In this case, the power receiver may request a free slot from the power transmitter again. When the power receiver receives ACK from the power transmitter, the power receiver may determine the location of its own private slot in a frame and then send a CI packet using the slot at the determined location.

In the configuration phase, the power transmitter may provide a series of locked slots for the exclusive use of the power receiver. In this case, the power receiver may perform the configuration phase without a collision. The power receiver may send two identification data packets IDHI and IDLO, a version information packet VSN, and optionally at least one proprietary data packet and a configuration packet CFG using the locked slots. When the configuration phase is completed, the power receiver may enter the negotiation phase.

In the negotiation phase, the power transmitter may continue to supply locked slots for the exclusive use of the power receiver. In this case, the power receiver may perform the negotiation phase without a collision. The power receiver may send a negotiation data packet (including a specific request SRQ) and a general request (GRQ)) and/or at least one optional proprietary data packet using the locked slots. Furthermore, the power receiver may terminate the negotiation phase by sending an SRQ/end-negotiation (en) packet. When the negotiation phase is terminated, the power transmitter enters the power transfer phase, and the power transmitter stops the supply of locked slots.

In the power transfer phase, the power receiver sends a CI packet using a free slot determined in the introduction phase and receives power. The power receiver may include a regulator circuit. The regulator circuit may be included in the aforementioned communications & control unit. The power receiver may self-regulate reflected impedance of the power receiver through the regulator circuit. That is, the power receiver may regulate reflected impedance using the regulator circuit in order to transfer the amount of power necessary for an external load, to prevent excessive power from being received, or to prevent overheating. In shared mode, the power transmitter may not regulate transmission power in response to a received CI packet in operating mode. In this case, the power receiver may control the regulator circuit in order to prevent an over-voltage situation.

In a shared mode, the power transmitter should manage information exchange with at least one power receiver. For this reason, the power transmitter provides a structure for communication with the power receiver, and such a structure will be described in detail hereinafter in relation to a communication frame structure of FIG. 9.

FIG. 9 is a diagram illustrating a frame structure for data communication.

Referring to FIG. 9, the power transmitter provides a structure that provides a sequence of time slots in which each power receiver may transmit data packet. A sync pattern is provided between slots. The sync pattern performs a function of separating slots and optimizing communication of the power receiver. Particularly, the sync pattern may provide information for collision resolution and guaranteed latency to the power receiver.

A shared mode protocol may use two kinds of frames, i.e., a slotted frame (see FIG. 9A) and a free-format frame (see FIG. 9B). When the power receiver transmits a short data packet to the power transmitter, the slotted frame may be used. The free-format frame may be used for an object such as transmission of a larger data packet in a bi-direction and coil selection in a multi coil transmitter.

All frames are started at a sync pattern and a measurement slot, and the measurement slot may be used for measurement of transmission power and reception power. As an embodiment, 9 slots may be included in one slotted frame. In the free-format frame, after a sync pattern and a measurement frame, there is no specific form limitation. A start bit (information) of the sync pattern may represent the start of the frame.

FIG. 10 is a diagram illustrating a format of a sync pattern according to an embodiment of the present invention.

Referring to FIG. 10, the sync pattern may include at least one of a preamble, a start bit, a response field, a type field, an info field, and a parity bit.

The preamble includes a sequence of bits set to '1'. The included bit number may be changed according to an operation frequency.

The start bit may be set to '0(ZERO)'.

The parity bit is a final bit of the sync pattern, and when bits set to 1 and included in data fields included in the sync pattern are the even number, the parity bit may be set to 1, and in the other case (i.e., when bits set to 1 and included in data fields included in the sync pattern are the odd number), the parity bit may be set to 0.

The response field may include a response of the power transmitter to communication using a preceding slot from the power receiver. '00' may represent that communication was not detected, '01' may represent that a communication error was detected, '10' may represent not-acknowledge to correct reception of communication, and '11' may represent acknowledge to correct reception of communication.

When a sync pattern including a corresponding type field is a first sync pattern included in a frame, the type field may be set to '1'. Further, when a sync pattern including a corresponding type field is not a first sync pattern included in the frame, the type field may be set to '0'.

The info field has different values and meanings according to a sync pattern representing in the sync field (or type field).

First, when the type field is '1', the info field may represent that the frame is a slotted frame or a free-format frame. When the info field represents that the frame is a slotted frame, the info field may be set to '00'. Further, when the info field represents that the frame is a free-format frame, the info field may be set to '01'.

When the type field is '0', the info field may represent that a next slot is a slot allocated to a specific receiver, a locked slot temporarily provided to a specific receiver, or a free slot that can be used by any receiver. When the info field represents that a next slot is a slot allocated to a specific receiver, the info field may be set to '00'. Further, when the info field represents that a next slot is a locked slot temporarily provided to a specific receiver, the info field may be set to '01'. Further, when the info field represents that a next slot is a free slot that can be used by any receiver, the info field may be set to '10'.

As described above, a shared mode (or a shared mode protocol) may be optionally supported by a power transmitter/receiver. Therefore, it is necessary that the power transmitter that supports a shared mode (or a shared mode protocol) knows whether the power receiver to transmit power supports a shared mode (or a shared mode protocol). For example, while the power transmitter transmits power to the first power receiver, it may be assumed that a new second power receiver is introduced into a charge area (or a wireless chargeable area). In this case, when a newly introduced power receiver may support a shared mode (or a shared mode protocol), the power transmitter may simultaneously transmit power to a plurality of power receivers (first and second power receiver) positioned within a charge area and thus the power transmitter should know whether the second power receiver supports a shared mode (or a shared mode protocol).

Therefore, hereinafter, a new method is suggested that notifies whether support of a shared mode (or a shared mode protocol) by including information representing whether support of a shared mode in a configuration packet transmitted and received at an identification & configuration phase (or configuration phase).

FIG. 11 is a diagram illustrating a configuration packet according to a first embodiment of the present invention. In more detail, FIG. 11 is a diagram illustrating a format of a message payload included in a configuration packet according to a first embodiment of the present invention.

Referring to FIG. 11, the configuration packet may include a Maximum Received Power field, a Power Class field, a Count field, a ZERO field, a Reserved field, a Prop field, a Window Offset field, a Window Size field, an Operation Mode field, a Neg field, a Polarity (Pol) field, and a Depth field.

The Count field includes the number of selective data packets transmitted by a power receiver before a configuration packet. This field may be used only in an exclusive mode.

The Depth field may include a scaling factor calculated to 2 Depth for a requested FSK modulation depth. This field may be used only in an exclusive mode.

The Maximum Received Power field may include a received highest power value (expect to report in the power packet received by the power receiver) in a unit of 0.5 W.

The Operation Mode field (1 bit) may instruct whether the power receiver that transmits a configuration packet supports a shared mode (or a shared mode protocol). For example, when the Operation Mode field is set to '0', the Operation Mode field may instruct that the power receiver supports an exclusive mode (one-to-one wireless charge mode)(or an exclusive mode protocol). Alternatively, when the Operation Mode field is set to '1', the Operation Mode field may instruct that the power receiver supports a shared mode (one-to-N wireless charge mode) in addition to an exclusive mode (in addition to an exclusive mode).

When requesting the start of a negotiation phase in an exclusive mode to the power transmitter, the Neg field may be set to '1'. In other case, the Neg field may be set to '0'. This field may be used only in an exclusive mode.

When requesting that the power transmitter uses the negative FSK polarity, the Polarity (Pol) field may be set to '1' (i.e., fop<fmod). In contrast, when requesting that the power transmitter uses the negative FSK polarity, the Polarity (Pol) field may be set to '1'. This field may be used only in an exclusive mode.

The power class field may be set to '00'.

When requesting to control power transmission to the power transmitter using a proprietary method instead of proportional-integral-differential (PID) algorithm, the prop field may be set to '1', and in other case, the prop field may be set to '0'. This field may be used only in an exclusive mode.

The reserved field may be set to '0'.

The window offset field may include a time interval from the end of a window for averaging received power to a start bit of a received power packet in a unit of 4 ms. This field may be used only in an exclusive mode.

The window size field may include a size of a window used for averaging power received by the power receiver in a unit of 4 ms. This field may be used only in an exclusive mode.

A power transmitter operating in a shared mode may disregard fields used only in an exclusive mode among the above-described fields. Alternatively, a power transmitter that supports a shared mode protocol may disregard fields used only in an exclusive mode protocol among the above-described fields.

In the first embodiment, an example has been described that defines a bit (B4, b3) of a specific position of the configuration packet to an operation mode field and that directly instructs whether support of a shared mode, but the present invention is not limited thereto and at least one of reserved fields included in the configuration packet may be used as a field that instructs whether support of a shared mode (or a shared mode protocol).

Further, the configuration packet is not limited to the first embodiment, at least one of the above-described fields may be selectively included, and a new field may be additionally included.

FIG. 12 is a diagram illustrating a configuration packet according to a second embodiment of the present invention. In more detail, FIG. 12 is a diagram illustrating a format of a message payload included in a configuration packet according to a second embodiment of the present invention. A description of the remaining fields, except for a shared mode field among fields included in a configuration packet of this drawing is the same as that of FIG. 11 and therefore a detailed description thereof will be omitted.

Referring to FIG. 12, a configuration packet may include a shared mode field (1 bit) representing whether a shared mode (or a shared mode protocol) is supported. The shared mode field may instruct whether a power receiver that transmits a configuration packet supports a shared mode (or a shared mode protocol). For example, when the shared mode field is set to '0', the shared mode field may instruct that the power receiver does not support a shared mode (or a shared mode protocol). Alternatively, when the shared mode field is set to 1', the shared mode field may instruct that the power receiver supports a shared mode (one-to-N wireless charge mode)(or a shared mode protocol) (in addition to an exclusive mode).

In the second embodiment, an embodiment has been described that defines a bit (B4, b3) of a specific position of the configuration packet to a shared mode field and that directly instructs whether a shared mode (or a shared mode protocol) is supported and the present invention is not limited thereto, and at least one of reserved fields included in the configuration packet may be used as a field that instructs whether a shared mode (or a shared mode protocol) is supported.

Further, the configuration packet is not limited to the second embodiment and may selectively include at least one of the above-described fields and additionally include a new field.

In this way, the power receiver may notify the power transmitter whether a shared mode (or a shared mode protocol) is supported through the configuration packet at identification & configuration phase (or configuration phase). When a new power receiver is introduced into a charge area of a multi coil power transmitter while charging another power receiver, the present embodiment may be more efficiently used and this will be described hereinafter in relation to FIGS. 13 and 14.

In this specification, for convenience of description, an operation mode field of the first embodiment or a shared mode field of the second embodiment may be referred to as a 'mode field', 'shared field' or 'shared bit'.

FIG. 13 is a diagram illustrating a case of increasing the number of charging power receivers according to an embodiment of the present invention.

Referring to FIG. 13, while a power transmitter PTx transmits power to a first power receiver PRx1 positioned within a charge area 13010, it may be assumed that a new second power receiver PRx2 is introduced into the charge area 13010. In this case, the power transmitter PTx may be a power transmitter including multi coils. In this case, as a second power receiver Rx2 transmits a configuration packet to the power transmitter at the identification & configuration phase (or configuration phase) according to a second embodiment, the power transmitter PTx may detect the second power receiver PRx2 without stop of power transmission to the first power receiver PRx1.

In more detail, when the power transmitter PTx detects a new object, in order to detect whether a corresponding object is a power receiver, the power transmitter PTx may use a free-format frame. Further, when a corresponding object is a power receiver, in order to additionally detect an optimal coil for power transmission, the power transmitter PTx may use a free-format frame.

For this reason, immediately after a measurement slot, the power transmitter PTx may activate at least one embedded primary coil and stand by reception of a data packet from the second power receiver PRx2. Because the second power receiver PRx2 does not detect FSK in a power signal, the second power receiver PRx2 may start in an exclusive mode and transmit a Signal Strength (SS) packet to the power transmitter PTx. The power transmitter PTx, having received the SS packet, may shut down the second power receiver PRx2. The process may be repeatedly performed for a free-format frame of (sets of) different primary coil(s).

With such a method, the power transmitter PTx may determine (or select) a primary coil most appropriate for power transmission. Thereafter, the power transmitter PTx may determine whether the second power receiver PRx2 supports a shared mode protocol using a primary coil(s) set determined as appropriate for power transmission. For this reason, the power transmitter PTx may restart the second power receiver PRx2 (still in an exclusive mode, at a next free-format frame, if possible) and receive a configuration packet from the second power receiver PRx2. In this case, the configuration packet may follow a format of the first or second embodiment.

The power transmitter PTx may recognize (or determine) whether the second power receiver PRx2 supports a shared mode through a field (operation mode field in the first embodiment and shared mode field in the second embodiment) that instructs whether support of a shared mode included in a configuration packet received from the second power receiver PRx2.

When it is recognized (or determined) that the second power receiver PRx2 supports a shared mode, the power transmitter PTx may start the second power receiver PRx2 at a start time point of a next slotted frame (i.e., may transmit power to the second power receiver). In this case, the second power receiver PRx2 may detect FSK in a power signal and follow a shared mode protocol (i.e., may operate in a shared mode) in order to participate in power transmission (or reception) together with the first power receiver PRx1.

In contrast, when it is recognized (or determined) that the second power receiver PRx2 does not support a shared mode, the power transmitter PTx may not transmit power to the second power receiver PRx2 (or may power down the second power receiver PRx2) until the power transmitter PTx is prepared to serve the second power receiver PRx2 in an exclusive mode.

FIG. 14 is a flowchart of a shared mode protocol of a power transmitter according to an embodiment of the present invention. A description described with reference to FIG. 13 may be equally applied to a description related to this flowchart and a repeated description may be omitted.

First, while transmitting power to a first power receiver, the power transmitter may detect a second power receiver (S14010). For example, the power transmitter may detect a second power receiver newly introduced to a corresponding charge area while transmitting power to the first power receiver positioned in a charge area.

Thereafter, the power transmitter may determine a primary coil appropriate for power transmission (S14020). In more detail, the power transmitter may determine at least one primary coil most appropriate for power transmission to the second power receiver. For this reason, the power transmitter may perform a process of sequentially activating at least one primary coil and receiving an SS packet from the second power receiver for a free-format frame.

Thereafter, the power transmitter may determine (or recognize/judge) whether the second power receiver supports a shared mode protocol using at least one primary coil determined at a previous step (S14030). In this case, the power transmitter may receive a configuration packet (using the primary coil) from the second power receiver, and a mode field included in the configuration packet instructs whether the second power receiver supports a shared mode protocol. Therefore, the power transmitter determines whether the second power receiver supports a shared mode protocol through a mode field of the received configuration packet.

Thereafter, when the second power receiver supports a shared mode protocol, the power transmitter may simultaneously transmit power to the first and second power receivers according to a shared mode protocol (S14040).

Although not shown in this flowchart, when the second power receiver does not support a shared mode protocol, the power transmitter may not transmit power to the second power receiver until the power transmitter is prepared to serve the second power receiver in an exclusive mode.

FIG. 15 is a flowchart of a shared mode protocol of a power receiver according to an embodiment of the present invention. This flowchart corresponds to that of FIG. 14, and a description described with reference to FIGS. 13 and 14 may be equally applied to that of FIG. 15 and a repeated description may be omitted.

First, the power receiver (e.g., the second power receiver) may be detected by a power transmitter transmitting power to another power receiver (e.g., the first power receiver) (S15010).

Thereafter, the power receiver may transmit a configuration packet to the power transmitter (S15020). In more detail, the power receiver may generate a configuration packet representing whether the power receiver supports a shared mode protocol and transmit the configuration packet to the power transmitter. Particularly, a mode field of the configuration packet may instruct whether the power receiver supports a shared mode protocol, and when a mode field is set to 1', the mode field instructs that the power receiver supports the shared mode protocol, and when a mode field is set to '0', the mode field instructs that the power receiver does not support a shared mode protocol.

Thereafter, when the power receiver supports a shared mode protocol, the power receiver may detect FSK in a power signal and participate in power transmission (or reception) of the power transmitter together with another power receiver according to a shared mode protocol (S15030).

Although not shown in this flowchart, when the power receiver does not support a shared mode protocol, the power receiver may not receive power until the power transmitter is prepared to serve the corresponding power receiver in an exclusive mode.

In this specification, a shared mode protocol and a method of instructing whether support of a shared mode protocol have been described.

According to the present invention, while a power transmitter transmits power, even if a new power receiver participates in charge, the power transmitter can let the new power receiver be participated in power transmission effectively without disturbing power transmission to an already charging power receiver. Further, according to the present invention, a power receiver operating in an exclusive mode among a plurality of power receivers operating in a shared mode can be detected.

The drawings have been divided and described for convenience of description, but the embodiments described with reference to the drawings may be merged and designed to implement new embodiments. Furthermore, the display device is not limited and applied to the configurations and methods of the aforemtioned embodiments, but some or all of the embodiments may be selectively combined and configured so that the embodiments are modified in various ways.

Furthermore, although some embodiments of this specification have been illustrated and described, this specification is not limited to the aforementioned specific embodiments and may be modified in various ways by those skilled in the art to which this specification pertains without departing from the gist of this specification claimed in the claims. The modified embodiments should not be individually interpreted from the technical spirit or prospect of this specification.

Various embodiments have been described in a best mode for executing the present invention.

The present invention may be applied to various wireless charge technologies.

What is claimed is:

1. A method in which a power transmitter comprising multi coils transmits wireless power, the method comprising:
   detecting a second power receiver while transmitting power to a first power receiver;
   determining at least one primary coil appropriate for power transmission;
   determining whether the second power receiver supports a shared mode protocol using the determined at least one primary coil; and
   transmitting, if the second power receiver supports a shared mode protocol, power to the first and second power receivers according to the shared mode protocol,
   wherein the shared mode protocol is a protocol that simultaneously manages information exchange between the power transmitter and a plurality of power receivers,
   wherein the determining of whether the second power receiver supports the shared mode protocol comprises:
   receiving a configuration packet from the second power receiver; and
   determining whether the second power receiver supports the shared mode protocol through a mode field included in the configuration packet.

2. The method of claim 1, wherein the determining of whether the second power receiver supports the shared mode protocol through the mode field comprises:
   determining that the second power receiver supports the shared mode protocol when the mode field is set to '1', and
   determining that the second power receiver does not support the shared mode protocol when the mode field is set to '0'.

3. The method of claim 1, further comprising starting, if the second power receiver supports the shared mode protocol, power transmission to the second power receiver at a start time point of a next slotted frame.

4. The method of claim 1, further comprising not transmitting, if the second power receiver does not support the shared mode protocol, power to the second power receiver until the power transmitter is prepared to serve the second power receiver in an exclusive mode,
  wherein the exclusive mode is a mode that serves one power receiver at one time.

5. A method in which a power receiver receives wireless power, the method comprising:
  being detected by a power transmitter transmitting power to another power receiver;
  transmitting a configuration packet indicating whether the power receiver supports a shared mode protocol to the power transmitter; and
  detecting, if the power receiver supports the shared mode protocol, Frequency Shift Keying (FSK) in a power signal received from the power transmitter and participating in power transmission of the power transmitter together with the another power receiver according to the shared mode protocol,
  wherein the shared mode protocol is a protocol that simultaneously manages information exchange between the power transmitter and a plurality of power receivers,
  wherein a mode field included in the configuration packet indicates whether the power receiver supports the shared mode protocol.

6. The method of claim 5, wherein:
  the mode field indicates that the power receiver supports the shared mode protocol, when the mode field is set to '1', and
  the mode field indicates that the power receiver does not support the shared mode protocol, when the mode field is set to '0'.

7. The method of claim 5, further comprising starting, if the power receiver supports the shared mode protocol, power reception from the power transmitter at a start time point of a next slotted frame.

8. The method of claim 5, further comprising not receiving, if the power receiver does not support the shared mode protocol, power from the power transmitter until the power transmitter is prepared to serve the power receiver in an exclusive mode,
  wherein the exclusive mode is a mode in which the power transmitter serves one power receiver at one time.

9. A power transmitter, comprising:
  a coil assembly comprising multi coils;
  an inverter configured to convert a DC signal to an AC signal;
  a tank circuit configured to provide impedance matching;
  a communication unit configured to perform communication with a power receiver; and
  a control unit configured to control power transfer,
  wherein the power transmitter is configured to:
  detect a second power receiver while transmitting power to a first power receiver,
  determine at least one primary coil appropriate for power transmission,
  determine whether the second power receiver supports a shared mode protocol using the determined at least one primary coil, and
  transmit power to the first and second power receivers according to the shared mode protocol when the second power receiver supports the shared mode protocol,
  wherein the shared mode protocol is a protocol that simultaneously manages information exchange between the power transmitter and a plurality of power receivers, and
  wherein the power transmitter is further configured to receive a configuration packet from the second power receiver and determine whether the second power receiver supports the shared mode protocol through a mode field included in the configuration packet.

10. The power transmitter of claim 9, wherein the power transmitter is further configured to:
  determine that the second power receiver supports the shared mode protocol when the mode field is set to '1', and
  determine that the second power receiver does not support the shared mode protocol when the mode field is set to '0'.

11. The power transmitter of claim 9, wherein the power transmitter is further configured to start power transmission to the second power receiver at a start time point of a next slotted frame when the second power receiver supports the shared mode protocol.

12. The power transmitter of claim 9, wherein the power transmitter is further configured to do not transmit power to the second power receiver until the power transmitter is prepared to serve the second power receiver in an exclusive mode when the second power receiver does not support the shared mode, and
  wherein the exclusive mode is a mode that serves one power receiver at one time.

13. A power receiver, comprising:
  a coil assembly comprising multi coils;
  a power converter configured to convert AC power to a voltage and a current appropriate for a load circuit;
  a tank circuit configured to provide impedance matching;
  a communication unit configured to perform communication with a power receiver; and
  a control unit configured to control power transfer,
  wherein the power receiver is configured to:
  be detected by a power transmitter transmitting power to another power receiver,
  transmit a configuration packet indicating whether the power receiver supports a shared mode protocol to the power transmitter,
  detect Frequency Shift Keying (FSK) in a power signal received from the power transmitter, and participate in power transmission of the power transmitter together with the another power receiver according to the shared mode protocol, when the power receiver supports the shared mode protocol,
  wherein the shared mode protocol is a protocol that simultaneously manages information exchange between the power transmitter and a plurality of power receivers, and
  wherein a mode field included in the configuration packet indicates whether the power receiver supports the shared mode protocol.

14. The power receiver of claim 13, wherein:
  the mode field indicates that the power receiver supports the shared mode protocol when the mode field is set to '1',
  the mode field indicates that the power receiver does not support the shared mode protocol when the mode field is set to '0'.

15. The power receiver of claim 13, wherein the power receiver is further configured to start power reception from the power transmitter at a start time point of a next slotted frame when the power receiver supports the shared mode protocol.

16. The power receiver of claim 13, wherein the power receiver is further configured to do not receive power from the power transmitter until the power transmitter is prepared to serve the power receiver in an exclusive mode when the power receiver does not support the shared mode protocol, and wherein the exclusive mode is a mode in which the power transmitter serves one power receiver at one time.

* * * * *